US008226764B2

(12) United States Patent
Beuchle et al.

(10) Patent No.: US 8,226,764 B2
(45) Date of Patent: *Jul. 24, 2012

(54) SINGLE-PHASE HYDRAULIC BINDER, METHODS FOR THE PRODUCTION THEREOF AND STRUCTURAL MATERIAL PRODUCED THEREWITH

(75) Inventors: Guenter Beuchle, Karlsruhe (DE); Peter Stemmermann, Karlsruhe (DE); Uwe Schweike, Karlsruhe (DE); Krassimir Garbev, Eggenstein-Leopoldshafen (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 311 days.

This patent is subject to a terminal disclaimer.

(21) Appl. No.: 12/670,109

(22) PCT Filed: Jul. 16, 2008

(86) PCT No.: PCT/EP2008/005786
§ 371 (c)(1),
(2), (4) Date: Jan. 21, 2010

(87) PCT Pub. No.: WO2009/015771
PCT Pub. Date: Feb. 5, 2009

(65) Prior Publication Data
US 2010/0206199 A1 Aug. 19, 2010

(30) Foreign Application Priority Data
Jul. 27, 2007 (DE) .......................... 10 2007 035 258

(51) Int. Cl.
*C04B 12/00* (2006.01)
(52) U.S. Cl. ........................................ 106/713; 106/724
(58) Field of Classification Search .................. 106/713, 106/724
See application file for complete search history.

(56) References Cited

U.S. PATENT DOCUMENTS

| 5,804,175 | A | 9/1998 | Ronin | |
|---|---|---|---|---|
| 2004/0089203 | A1 | 5/2004 | Ronin | |
| 2010/0186634 | A1* | 7/2010 | Beuchle et al. | 106/638 |
| 2011/0041737 | A1* | 2/2011 | Beuchle et al. | 106/739 |

FOREIGN PATENT DOCUMENTS

| DE | 2 222 545 | | 11/1972 |
|---|---|---|---|
| DE | 117 437 | A1 | 1/1976 |
| DE | 195 48 645 | A1 | 6/1997 |
| EP | 0 470 948 | A | 2/1992 |
| EP | 0 500 840 | B1 | 3/1999 |
| WO | WO 91/06513 | A | 5/1991 |
| WO | WO 2007/017142 | A | 2/2007 |

OTHER PUBLICATIONS

Sun et al., "29 Si NMR Study of the Hydration of Ca3SiO5 and beta-Ca2SiO4 in the Presence of Silica Fume", Journal of the American Ceramic Society, vol. 82, No. 11, 1999, pp. 3225-3230.
Garbev et al., "Structural Features of C-S-H (I) and its Carbonation in Air-A Raman Spectroscopic Study, Part 1: Fresh Phases", Journal of the American Ceramic Society, vol. 90, No. 3, Mar. 2007, pp. 900-907.
Mi et al., "Mechanochemical synthesis of tobermorite by wet grinding in a planetary ball mill", Powder Technology, vol., 93, 1997, pp. 77-81.
Friedrich Wilhelm Locher: "Cement Principles of Production and Use", 2006, Verlag Bau + Technik GmbH, Duesseldorf, p. 354-356.
Hoffmann et al., "Integrated Chemical Processes: Synthesis, Operation, Analysis and Control", 2005, Wiley-VCH Verlag GmbH & Co. KGAA Weinheim.

* cited by examiner

*Primary Examiner* — Paul Marcantoni
(74) *Attorney, Agent, or Firm* — Muncy, Geissler, Olds & Lowe, PLLC

(57) ABSTRACT

The invention relates to a monophase hydraulic binder containing silicon, calcium, oxygen and hydrogen atoms in an arrangement comprising silicate building units having an average connectedness of higher than $Q^{1.5}$ and silanol groups, with none or a part of the calcium atoms being substituted for by a metal atom $M[6]^{x+}$ sixfold or higher-coordinated with oxygen and/or none or a part of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.2 to 2.0, and the binder having an $H_2O$ content of 3.5% by weight to 20% by weight, as well as a mixture containing this binder.

Furthermore, the invention relates to methods for manufacturing the binder or a mixture containing this binder by reaction grinding a starting material of silicate building units having a connectedness of $Q^0$ to $Q^2$, and optionally further materials, with a solid silicate raw material having a ceonnectedness of the silicate building units of $Q^3$ to $Q^4$ and optionally drying the monophase hydraulic binder to an $H_2O$ content of 3.5% by weight to 20% by weight.

Finally, the invention relates to a building material made by setting the binder or a mixture containing this binder with water and subsequent hardening.

15 Claims, No Drawings

SINGLE-PHASE HYDRAULIC BINDER, METHODS FOR THE PRODUCTION THEREOF AND STRUCTURAL MATERIAL PRODUCED THEREWITH

This application is a national stage of International Application No.: PCT/EP2008/005786, which was filed on Jul. 16, 2008, and which claims priority to German Patent Application No.: 10 2007 035 258.3, which was filed in Germany on Jul. 27, 2007, and which are both herein incorporated by reference.

The invention relates to a monophase hydraulic binder, a mixture containing such binder, a method for manufacturing the binder and the mixture as well as a building material manufactured with the binder or the mixture.

Hydraulic reactivity describes the reaction of a binder with water so that a solid material is formed. The definition of this process is made on the basis of the conventionally known hydraulic binders, such as Portland cement. According to Härig, Günther, in Klausen, *Technologie der Baustoffe [Technology of Building Materials]*, C. F. Müller Verlag, Heidelberg, 1996, p. 53, hydraulic binders harden in air as well as under water after water has been added. According to H. F. W. Taylor, *The chemistry of cements*, Academic Press, London 1964, p. 2 et seq., cement is a hydraulic binder which, mixed with water to a paste (cement paste), independently starts to stiffen and hardens into cement stone due to chemical reactions between the water and the compounds present in the cement. In this process, the stiffening and hardening depend neither on drying nor on reactions with the $CO_2$ from the air. Therefore, the reaction takes place in the air as well as under water.

Moreover, latent hydraulic binders (so-called pozzolanic binders) are known. According to Härig (see above) they harden only in the presence of an activator after water has been added. In order to start the setting reaction, e.g. lime hydrate or Portland cement are added; however, there will be no independent reaction.

Conventionally known hydraulic binders based on silicates do not contain any molecular water, their hydraulic components contain no hydrogen in their summation formula, and the hydraulic components for the most part consist of crystalline alkali (earth) silicates. According to H. F. W. Taylor, *The chemistry of cements*, Academic Press, London 1964, p. 2 et seq., the silicate ions of the hydraulically active phases are present in the form of single isolated or monomeric silicate tetrahedra($Q^0$). An exception is the rare phase belinite, which is a cyclosilicate and contains chlorine. In belinite, each silicate tetrahedron is linked with two further silicate tetrahedra ($Q^2$) via common oxygens. All conventionally known hydraulic binders based on silicates contain a molar ratio of $CaO:SiO_2$ of at least two.

Such hydraulic binders are used purely or mixed with other materials as cement in various ways for manufacturing solid building materials such as concrete, mortar or in special binders. Moreover, two further types of mostly higher condensed silicate and amorphous (but not hydraulic) binders are of technical importance, namely water glasses on the one hand and latent hydraulic or pozzolana materials, such as blast-furnace slags, fly ashes, etc., on the other hand.

1. Cement is manufactured by burning calcium carbonate and a silicate carrier at approximately 1,450° C. together to a product which is called (cement) clinker and substantially consists of the hydraulically reactive clinker phases tricalcium silicate (alite, $Ca_3SiO_5$), dicalcium silicate (belite, particularly β-$Ca_2SiO_4$) and on a subordinate level tricalcium aluminate $Ca_3Al_2O_6$ and calcium aluminate ferrite $Ca_4(Al, Fe)_4O_{10}$. By grinding and adding further materials, particularly gypsum or anhydrite as reaction retarders, so-called Portland cement (CEM I) is obtained. CEM I is often ground with latent hydraulic silicates to the cement types CEM II to CEM V. The grinding produces a higher surface which accelerates the speed of the hydraulic reaction. According to DIN 1164, Portland cement consist of 61% to 69% of calcium oxide CaO, 18% to 24% of silicon dioxide $SiO_2$, 4% to 8% aluminum oxide of $Al_2O_3$ and 1% to 4% of iron oxide $Fe_2O_3$.

2. Furthermore, so-called water glasses are manufactured. These are solid, but water-soluble glasses made from alkali oxides and $SiO_2$, which are melted at approximately 1,400° C. Water glasses are used as concentrated, strongly alkaline solutions or powders.

3. Moreover, silicate starting materials can be caused to react to a binder by reaction with a lye, with alkali hydroxides being used as lyes. The resulting product is mostly called a geopolymer, however, it is only of small economic importance.

Types 2 and 3, water glasses and geopolymers, are to be regarded as hydraulic binders only to a limited degree in the sense of the definitions mentioned at the beginning as they either already exist as solutions, that is, not solid, and do not harden, respectively, under water due to their high water solubility (alkali silicate) or are not reactive as solid materials and need additives such as CEM I or lye to set the hydraulic reaction in motion. Their manufacture requires both particular starting materials and respectively several laborious procedural steps which make their manufacture expensive. At the same time, their compatibility with various additives is extremely limited due to the very high pH values and it is not possible to effectively influence the reaction speed, which commonly is very slow, in particular, it is not possible to accelerate it. Due to the limited processability (slow hardening, strongly alkaline reaction) and the low strength their range of application is limited.

The hydraulic binder which is best known and used most often is cement, in particular Portland cement. According to H. F. W. Taylor, *Cement chemistry*, Academic Press, London 1990, p. 64 et seq., the burning process required for the manufacture of the preproduct cement clinker at temperatures of up to about 1,450° C. with a theoretical reaction enthalpy of +1,761 kJ per kg of cement clinker uses especially much energy. The lion's share of the required energy is taken up by the calcination (or decarbonation) of calcium carbonate originating from limestone, calcareous clay or other calcareous materials. The reaction releases $CO_2$ and contributes to the overall reaction in a strongly endothermic manner with an enthalpy of reaction of +2,138 kJ per kg of cement clinker.

About 1.2 kg of lime are needed to manufacture 1 kg of Portland cement. Additionally, in order to create the hydraulically active clinker phases alite, belite, tricalcium aluminate and calcium aluminate ferrite it is necessary to partly melt the starting materials. As a sum of the theoretically required energy, the heat losses, the grinding energy, etc., an actual overall energy consumption of about +4,300 kJ per kg is the result for the end product Portland cement.

During the manufacture of Portland cement, considerable amounts of $CO_2$ are released from the calcium carbonate containing materials, which in total add up to about 850 g of $CO_2$ per kg of clinker.

The reaction of Portland cement with water leads to solidification (hardening). According to H. F. W. Taylor, *Cement chemistry*, Academic Press, London 1990, p. 218, C—S—H gels, that is, poorly crystalline calcium silicate hydrates, as well as calcium aluminate hydrates and portlandite $Ca(OH)_2$ are produced. The latter is a necessary consequence of the setting reaction and occurs at a proportion of about 20% by weight in the set, i.e., hardened cement stone.

It is not possible to substantially lower the overall content of calcium in Portland cement in general and particularly in the preproduct clinker because otherwise the hydraulic reactivity will strongly decrease. The overall content of calcium expressed as a molar ratio of Ca:Si which incidentally is identical to the molar ratio of $(CaO):(SiO_2)$ is always at 3.0+/−0.2. The binder matrix of C—S—H gel present in the cement stone made from Portland cement which substantially results from the reaction of tricalcium silicate $Ca_3SiO_5$, has a molar ratio of Ca:Si of 1.7 to 1.8. The excess CaO is present as portlandite $Ca(OH)_2$ after the hydration.

Portlandite contributes to the mechanical stability of the building material only to a minor degree. Rather, portlandite determines the pH value of the building material during service life of the cements, which will then be about pH 12.5. Acid attacks are buffered by portlandite at first; however, once it has been consumed, for example, by having been transformed into $CaCO_3$ by $CO_2$, the pH value will decrease and the binder matrix made of C—S—H gel will be attacked and decomposed.

It is possible to inhibit the reaction by creating a structure as dense as possible and thus slow down the material transport. However, the dissolution of portlandite itself will generate new opportunities for attack. The buffering of the pH value in cement by portlandite thus represents a limited corrosion protection for constructional steel. In contrast thereto, the high alkalinity generated by portlandite prevents the use of base or alkali sensitive additives in cement-bound building materials, such as organic fibres. A pH value of higher then 9.5 would suffice for corrosion protection.

Portland cement releases a high enthalpy of reaction when it sets, which substantially results from the formation of portlandite and leads to heat accumulations in large, massive or voluminous building elements. The temperature build-up per unit of time may be decreased by decelerating the reaction rate by means of grain enlargement, additive agents or dilution with fly ashes. However, this also slows down the strength development.

The strength of cement stone is determined by the main component C—S—H gel which is only about 50% by weight. Therefore, the effective energy consumption for manufacturing the strength-determining constituents of cement stone made from Portland cement is approximately 8,600 kJ per kg. The other half of the cement stone, essentially calcium aluminate hydrates and portlandite, hardly contributes to the strength of the material or building material, and with regard to strength it is an undesired by-product. The amount of portlandite may be reduced subsequently in technical systems by admixing micro-silica or latent hydraulic substances. Excess portlandite will then slowly react to additional calcium silicate hydrates by consuming microsilica. However, this process is laborious and expensive.

Moreover, C—S—H gels may incorporate various amounts of calcium. When the calcium content increases, the connectedness of the associated silicate building units will decrease and so will their contribution to the strength of the building material as well as their chemical stability. In set Portland cement stone the C—S—H gels are present with a molar ratio of Ca:Si of 1.7 to 1.8. In contrast to that, calcium silicate hydrates exist in a range of the molar ratio of Ca:Si of 0.5 to 3.0. This is proven by naturally occurring or synthetically produced solid materials.

Due to the reasons as mentioned it would make sense to aim at C—S—H gels having a low calcium content in a hardened hydraulic binder in general and in cement stone made from Portland cement in particular. However, a slight reduction of the calcium content during the production of Portland cement clinker in a rotary kiln already results in less reactive calcium silicates and to an increase in the content of belite in particular. A further decrease of the calcium content leads to hydraulically inactive products such as wollastonite $\beta$-$CaSiO_3$, pseudowollastonite $\alpha$-$CaSiO_3$ or rankinite $Ca_3Si_2O_7$. In this manner, that is, on a "clinker route", it is not possible to obtain hydraulic binders low in calcium.

In the system of $CaO$-$SiO_2$-$H_2O$ there are pure calcium silicate hydrates having molar ratios of Ca:Si which are smaller than 2.0 and in particular smaller than or equal to 1.0. Naturally occurring minerals, such as tobermorite-11 Å, tobermorite-14 Å, xonotlite, $\alpha$-$C_2SH$, or suolunite [according to Young-Hwei Huang, *Suolunite*, a new mineral, American Mineralogist 53 (1968), p. 349] as well as synthetic products are known. Due to their molar ratio of Ca:Si these compounds have a silicate connectedness between $Q^0$ and $Q^3$ and in some cases contain silanol groups, however, no hydraulic activity or latent hydraulic behaviour is known from any of these phases.

Moreover, there are compounds in which the calcium ions are partly substituted for: $M^{(+II)}H_xM^{(+I)}{}_{(2-x)}[SiO_4]$, with $M^{(+II)}$=alkaline earth metal and $M^{(+I)}$=alkali metal. In this case similar molar ratios of Ca:Si and thus a similar connectedness as in the above-mentioned pure calcium silicate hydrates also occur and so do silanol groups in some cases. No hydraulic reaction or latent hydraulic behaviour is known either from any of these phases.

In *Mechano-radicals produced from ground quartz and quartz glass*, Powder Tech. 85 (1995) p. 269, Hasegawa et al. describe changes occurring during the grinding of quartz by detecting defective portions on the surface of the quartz by spectroscopic methods. In this process, no hydraulic phases are produced.

In *Modification of kaolinite surfaces through mechanochemical activation with quartz: a diffuse reflectance infrared fourier transform and chemometrics study*, Appl. Spectroscopy 60 (2006), p. 1414, Carmody et al. prove the changes of kaolinite surfaces by grinding them together with quartz. This case does not produce a new phase which is hydraulically reactive.

In *Mechanism for performance of energetically modified cement versus corresponding blended cement*, Cem. Concr. Res. 35 (2005), p. 315, Justnes et al. describe the grinding of cement together with quartz and the reduction of the grain size of both mixture partners occurring therein. Again, no new phase is generated. Quartz is explicitly called a non-reactive filler.

M. Senna, *Incipient chemical interactions between fine particles under mechanical stress—a feasibility of producing advanced materials via mechanochemical routes*, Solid state Ionics 63-65 (1993) p. 3-9, discloses that oxides and hydroxides in the form of very fine particles, for example as $Ca(OH)_2$ and $SiO_2$, change at their surfaces under the influence of hydroxyl groups or of water by a grinding homogenization which is also called soft mechanochemistry. In this process a destruction of the crystal structure (amorphization) and dehydration of the hydroxides could be observed. These findings were obtained due to clear changes in the thermal treatment for burning ceramics which are not hydraulically active.

WO 2007/017142 A2 discloses a method for manufacturing belite binders. Belite does not contain any hydrogen bonded to oxygen and has a connectedness of $Q^0$.

DE 22 22 545 B2 discloses a method for manufacturing a water-containing calcium silicate of the xonotlite type, the xonotlite being crystalline. Due to the hydrothermal manufacture, the amorphous preproduct described in this patent is a hydrate which does not harden hydraulically.

EP 0 500 840 B1 discloses tectoalumo silicate cement as well as an associated manufacturing method, the tectoalumo silicate having a connectedness of $Q^4$. Moreover, the hydraulic hardening of corresponding compounds is not based on the formation of C—S—H phases.

According to DE 195 48 645 A1, which describes a method for manufacturing secondary raw materials from demolition material, concrete demolition material is activated by grinding. However, the grinding is made such that no hydraulic product is formed, but a product which may be used as a cement raw mix constituent. If concrete demolition material is used the starting component moreover contains a sulfate carrier which as a reaction product should prevent the manufacture of a monophase product.

Starting therefrom, it is the object of the present invention to propose a monophase hydraulic binder, a mixture containing such binder, methods for the manufacture of the building material and the mixture as well as a building material which has been produced with the binder or the mixture which do not have the aforementioned drawbacks and limitations.

In particular, a monophase hydraulic binder based on silicate and a mixture containing this binder are to be provided, which, as compared to conventional Portland cement and to hydraulic or latent hydraulic binders, respectively,

- lowers the energy consumption during the manufacture of the binder, i.e. which is manufactured at low temperatures,
- lowers the amount of the $CO_2$ emissions,
- shows a lower total release or a more uniform release of heat during hydration, and
- achieves higher durability and strength of building materials and materials, respectively, made using this binder.

This object is achieved by the features of claim 1 with regard to the monophase hydraulic binder, by the feature of claim 6 with regard to the mixture, by the features of any one of claims 8 to 10 with regard to the manufacturing method and by the features of claim 14 with regard to the building material. The subclaims each describe advantageous embodiments of the invention.

The inventive hydraulic binder is a hydraulically active silicate compound containing calcium, silicon, oxygen and hydrogen. Other elements may also be constituents of the binder and are distinguished according to the type of their incorporation: alkali metals, in particular sodium; alkaline earth metals, in particular magnesium, or other divalent cations, in particular Fe[+II] and manganese; trivalent cations, in particular Al[+III], are incorporated as $M[6]^{x+}$ six-fold or higher coordinated with oxygen, with the $M[6]^{x+}$ partly substituting for the calcium. Elements tetrahedrally coordinated by oxygen, in particular phosphorous, aluminum or $Fe^{3+}$, form oxygen anions and are incorporated as phosphate, aluminate or ferrate on tetrahedral positions as $M[4]^{y+}$, partly substituting for silicon. The amphoteric aluminum is suitable for both variants, just like magnesium. The exponents x+ and y+ respectively indicate the charge of the relevant cation.

The stoichiometry of the inventive hydraulic binder is defined by the range of the molar ratio of Ca:Si of 0.2 to 2.0, particularly preferable of 0.3 and up to below 1.0. The components oxygen, hydrogen and calcium, respectively, and further elements provide for the charge equalibration. In case that a part of the calcium or silicon atoms is replaced by the substituents $M[6]^{x+}O_{x/2}$ and $M[4]^{y+}O_{y/2}$, respectively, the modified molar ratio $[CaO+(x/2)\cdot(M[6]^{x+}O_{x/2})]:[SiO_2+M[4]^{y+}O_{y/2}]$ will be indicated instead of the simple molar ratio of Ca:Si, which is identical to the molar ratio of (CaO):(SiO_2).

Following X-ray diffraction studies (X-ray powder diffractometry), the binder turns out to be X-ray amorphous.

Silicate ions consist of oxygen tetrahedra, the center of which is occupied by a tetrahedrically coordinated silicon. The silicate tetrahedra thus structured are linked with each other via common oxygen atoms. Silicon atoms may be substituted for by aluminum atoms in higher proportions and by boron, germanium, titanium, iron, beryllium or phosphorous atoms in lower proportions. The structure of the silicate atoms in the inventive hydraulic binder is characterized by a variable linkage of the tetrahedra.

Studies with $^{29}Si$ solid state NMR spectroscopy showed a broad distribution of the silicate connectedness: NMR signals occurred with the typical chemical shifts for $Q^0$ (monomeric silicate tetrahedra) via $Q^1$, $Q^2$, $Q^3$ to $Q^4$. The exponent indicates the number of neighboring tetrahedra linked to the observed tetrahedron via common oxygens: $Q^1$ describes a silicate dimer or the terminal silicate tetrahedra in a chain arrangement with $Q^2$ chain links; $Q^3$ and $Q^4$ correspond to silicate tetrahedra with three and four silicate tetrahedra as neighbors, respectively. The discovered distribution width of the monophase hydraulic binder has an average connectedness of higher than $Q^{1.5}$ and does not only prove the occurrence of various types of connectedness $Q^n$ but also a high disorder of the individual connectedness types.

It is possible to substitute silicon atoms in part by atoms of other network forming elements, in particular of aluminum, boron, germanium, phosphorous, iron, beryllium or titanium. The substitution of aluminum which at most may reach a molar ratio of Al:Si of 1:2 is of particular relevance.

The calcium atoms are present in the form of $Ca^{2+}$ ions as bonding partners of the negatively charged silicate units. It is possible to partially substitute them by Na, K, Li, Mg, Sr, Ba, Mn, Fe[+II] or Al[+III] atoms.

The hydrogen atoms are present in the form of silanol groups and optionally as molecular water or as hydroxide; this occurrence may be detected by means of infrared or Raman spectroscopy, wherein vibration modes have been found for Si—OH (silanol group). Apart from that, vibration modes for Ca—OH and H—O—H can be detected.

The totalized $H_2O$ content (water content) of the inventive monophase hydraulic binder is contrary to known binders such as cement clinker. It comprises the proportion of the binder, which is bonded in oxygen-hydrogen bonds, wherein the $H_2O$ content is between 3.5% by weight and 20% by weight.

Thus, the present invention relates to a monophase hydraulic binder consisting of hydraulically active calcium silicate. In comparison to Portland cement this binder contains less calcium and fewer calcium-substituting elements, respectively, such that the molar ratio $[CaO+(x/2)\cdot(M[6]^{x+}O_{x/2})]:[SiO_2+M[4]^{y+}O_{y/2}]$ is lower. The inventive monophase hydraulic binder may be manufactured qualitatively from the same starting materials as Portland cement, which, however, are used in amounts different therefrom. Moreover, the manufacturing process requires lower temperatures, which means that energy consumption and carbon dioxide emissions will be reduced.

Furthermore, the present invention relates to a mixture comprising a proportion of the inventive monophase hydraulic binder. Preferably, the proportion is at least 10% by weight, particularly preferably at least 25% by weight, above all preferably at least 50% by weight.

As is known from Portland cement, the setting and also the hardening are carried out by mixing with water and optionally take place under water. The hydration creates a mechanically solid building material. The hydraulic reaction of the inventive hydraulic binder does not produce portlandite $Ca(OH)_2$, at no time can it be detected by X-ray diffraction. Moreover, the setting reaction proceeds with lesser release of heat than during the hydration of Portland cement. As already known in case of Portland cement, the setting speed can be adjusted in a wide range by substituting various elements, varying the processing (e. g. grinding) as well as by surface-active additives, such as organic additives. The maximum of the heat of hydration will then be reached after a period of time of several minutes or only after several days.

During setting the inventive hydraulic binder reacts to a calcium silicate hydrate (C—S—H phase) having a molar ratio of at least 0.2 and less than 1.5. In this process the connectedness of the silicate building units changes on the molecular level, solidification takes place on the macroscopic level.

Depending on the composition of the starting material, the hydration product may optionally inclose further alkali metals, alkaline earth metals or other elements such that a calcium silicate hydrate having a molar ratio of Ca:Si of smaller than or equal to 1.0 is generated. In contrast thereto, set Portland cement consists of a C—S—H gel (cement gel) having a molar ratio of Ca:Si of 1.7 to 1.8 and additionally contains portlandite $Ca(OH)_2$.

The building material manufactured by the setting reaction according to the invention is chemically more stable than Portland cement stone due to the absence of portlandite, due to the lower molar ratio of Ca:Si as compared to cement stone made from Portland cement and due to the higher connectedness of the silicate building units. The compressive strength measured after 28 days exceeds 20 $N/mm^2$. This value is within the order of magnitude of the European standard EN 197 for cements indicating 3 different classes for strength of 32.5, 42.5, and 52.5 $N/mm^2$.

If the inventive binder contains less than 1% of $Na_2O$, it may be reacted to an inventive building material, together with alkali-sensitive additives, such as inorganic or organic fibres with low alkali durability.

The manufacture of the inventive monophase hydraulic binder or a mixture containing the inventive monophase hydraulic binder is made by co-grinding (reaction grinding) a preproduct containing calcium, silicon, oxygen and hydrogen having monomeric or dimeric silicate building units (i. e. a calcium silicate hydrate) with a solid silicate raw material having a high connectedness, such as quartz or quartz sand.

In this case the first starting material is characterized by the chemical elements of calcium, silicon, oxygen and hydrogen which are present in the form of structural water, crystal water or OH groups as well as monomeric or dimeric silicate units.

The second starting material is a siliceous solid material characterized by a high connectedness of the silicate tetrahedra of $Q^3$ to $Q^4$.

In a particular embodiment both starting materials are present in a common material. For this purpose, old cement stones or mortars, i.e. which are no longer used as building material and already contain calcium silicate hydrates, optionally aggregates and sand, are preferably suitable and are directly ground.

Moreover, in a particular variant of this embodiment one of the starting materials is further added to achieve a certain composition, particularly with regard to a desired molar ratio of Ca:Si within the inventive range. Further, small amounts of water may be added for this adjustment.

In a further embodiment base materials, which at first react to the first starting material during grinding, and the second starting material are used. This is preferably performed by a batch comprising the grinding of portlandite $Ca(OH)_2$ and aerosil (amorphous $SiO_2$). At first, portlandite and aerosil react to a first starting material, i.e. a C—S—H phase, which then reacts with the second starting material, more high-polymer aerosil, to the inventive binder.

The inventive monophase hydraulic binder is made when grinding the starting materials in a mill, preferably under heightened shearing and pressure effects, for example in a disk vibration mill, a ball mill or a roller mill. The two reactants form a new material having an average connectedness of more than $Q^{1.5}$. The second starting material will be depolymerized during co-grinding. The monophase binder thus made contains silicate building units with silanol groups which will hydraulically react when the binder is mixed with water and lead to setting and solidification.

The type and composition of the starting materials (reactants), together with the parameters of the co-grinding, determine the exact composition, structure and hydraulic reactivity of the binder. In particular, the calcium content leads to products reacting hydraulically at different speeds, for example, if a synthetic calcium silicate hydrate is used as the first starting material having a molar ratio of Ca:Si of 1.0 to 1.2.

Generally, the first starting material is made by using one of the methods explained below:

In a thermal method alkali/alkaline earth silicates are firstly produced at temperatures of up to 700° C. by sintering alkali compounds, alkaline earth compounds and silicates together. A subsequent treatment with water will lead to the desired alkali/alkaline earth silicate hydrate by incorporation of crystal water. The manufacture of $CaNa_2SiO_4 \cdot n\ H_2O$ from $CaCO_3$, $Na_2CO_3$, $SiO_2$ and $H_2O$ will serve as an example:

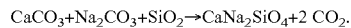

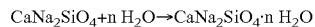

In a hydrothermal method in pressurized autoclaves at 140° C. to 300° C. calcium-containing raw materials such as CaO, $CaCO_3$ or $Ca(OH)_2$ and silicon-containing raw materials such as quartz, silica, mica, feldspars, old concretes, glasses or slags are directly reacted with water or water vapour in a pressurized autoclave. It is possible to add a lye, preferably NaOH or KOH. The lye adjusts the pH value to between 11 and 13, increases the reaction speed and allows the use of slowly reacting silicon compounds as raw material.

In a mechanochemical method calcium-containing raw materials such as CaO, $CaCO_3$ or $Ca(OH)_2$ and the silicon-containing raw materials are ground in a mill, again optionally by adding a lye. In unreactive systems, such as the grinding of CaO with quartz sand, the above-mentioned hydrothermal treatment step has to follow.

Apart from that, the manufacture of a first starting material is possible by hydrating cement clinkers or by sol-gel methods.

Quartz, quartz sand or another raw material, secondary raw material or a synthetic product serve as a second starting material (silicate carrier). Examples of these are silicate glasses, feldspars or slags.

Moreover, it is possible to form both starting materials together or that they are already present in mixed form:

a) In-situ formation: The first starting material is only formed during grinding and will then react with the excess or additional high-polymer second starting material.

b) Mixed starting materials: The two starting materials are already present together in a mixture and are directly reaction ground.

In another embodiment it is possible to manufacture composite binders by using blast-furnace slag, fly ashes, natural pozzolanas or conventional (Portland) cement. The latter is of particular interest if the cement made according to the invention reacts very quickly (reaction control) or if the mixture of the starting materials contains more calcium than required.

Hydration products made from an inventive hydraulic binder contain calcium silicate hydrates having a low molar ratio of Ca:Si and thus are chemically more stable than C—S—H gels in Portland cement stone because no portlandite is formed and the silicate building units have a higher connectedness as compared to Portland cement stone. Furthermore, no weathering-sensitive portlandite is present at the contact points of the binder to the aggregate in mortars or concretes so that no weakened points form in the join of mortars and concretes. If the inventive binder contains less than 1% of $Na_2O$ the binder structure made therefrom is less sensitive to secondarily occurring alkali silica reactions so that alkali-sensitive aggregates may be used.

Below the invention will be explained in more detail by relating to embodiments.

EXAMPLE 1

A mechanochemically manufactured calcium silicate hydrate phase (C—S—H(I)) having a molar ratio of Ca:Si of 1.2 and quartz (finely grained, washed and calcined) served as starting materials.

The C—S—H(I) phase was mechanochemically synthesized according to Saito et al., *Mechanochemical synthesis of hydrated silicats by room temperature grinding*, Solid State Ionics, 101-103 (1997), p. 37, with aerosil, CaO and $H_2O$ being ground at a mass ratio of water:solid of 10 in a ball mill (grinding period 32 hours, rest condition every 20 min. for 10 min.) and subsequently dried for 120 hours at 60° C.

Next, the C—S—H(I) phase was ground together with the quartz at a mass ratio of 1:1 (1.1 g each) in a disk vibration mill for 180 seconds. Apart from a change of the grain sizes the grinding process particularly caused a reaction between the starting materials which resulted in an inventive hydraulic binder.

The BET surfaces of the starting materials were 68 $m^2/g$ for C—S—H(I) and 2 $m^2/g$ for quartz on average, while the mill product had a value of 3 $m^2/g$.

In the IR spectrum the reaction of the starting materials to the inventive binder was tracked. At first, the grinding clearly weakened the main band of the Si—O stretching vibration at 960 $cm^{-1}$ and the band of the Si—O—Si vibration at 668 $cm^{-1}$ of C—S—H(I) and both completely disappeared with intense treatment. The (Si—O) stretching vibrations of 1078 $cm^{-1}$ and 1173 $cm^{-1}$ of quartz disappeared as well, however, broadened and weakened bands at 1095 $cm^{-1}$ and 1165 $cm^{-1}$ were measured, i.e. quartz was depolymerised. In the range of the OH stretching vibration additional bands caused by silanol groups occur after grinding.

This finding was confirmed by $^{29}Si$ solid-state NMR studies. C—S—H(I) having a molar ratio of Ca:Si of 1.2 clearly contains $Q^1$ and $Q^2$ silicate species at a ratio of 3 to 2. After the grinding a broadening of the $Q^2$ signal, the constant $Q^1$ and newly $Q^3$ were present. $Q^4$ decreased which proves the depolymerization of $SiO_2$.

The results of the X-ray diffraction prove the reaction as well. Generally the X-ray amorphous proportion rises with an increasing grinding period. The characteristic basal reflection of C—S—H(I) having a molar ratio of Ca:Si of 1.2 at 11.45 Å. clearly decreases in intensity together with other reflections when the grinding period is short. Weak but still recognizable reflections appear shifted; e.g. from 3.05 Å and 2.8 Å to 3.02 Å and 2.84 Å, respectively.

The hydration of the hydraulic binder was followed by means of a thermal-conductivity calorimeter. Due to the heat of wetting, a maximum of the heat release occurred directly after the injection of water. Then the heat release subsided almost completely in order to finally rise after a minimum at about 25 minutes to a second maximum after 4 to 5 hours. After that the heat release slowly decreases and after 40 to 100 hours asymptotically approaches the zero line.

After hardening, the $Q^2$ NMR signal, which proves the new formation of the C—S—H phase, dominated the spectrum of the set building material. It was also possible to detect the new formation of the C—S—H phase by X-ray diffraction through reflections in the X-ray powder diffractogram at 3.05 Å and 2.8 Å as well as the generation of a broad reflection between 17 Å and 11.5 Å. Both measurements prove the formation of a calcium silicate hydrate having a lower molar ratio of Ca:Si in the set building material as compared to the starting material C—S—H(I).

Finally, in the IR spectrum of the pure set building material the (Si-O) stretching vibration of the C—S—H phase is at 970 $cm^{-1}$, which corresponds to a molar ratio of Ca:Si of <1, and thus to a higher polymerization as compared to Portland cement. Furthermore, the Si—O—Si band at 668 $cm^{-1}$ was clearly recognizable.

At a ratio of water to binder of 0.3 and by adding three parts of sand to one part of binder, a compressive strength of 20 $N/mm^2$ was exceeded after 28 days.

EXAMPLE 2

A hydrothermally synthesized mixture containing C—S—H(I) phase having a molar ratio of Ca:Si of 1.0 and quartz was used as starting materials for grinding.

First, the hydrothermal synthesis of the mixture will be described. For this purpose, $Ca(OH)_2$ and quartz were at first crushed for 180 seconds in a disk vibration mill and homogenized. 90 ml of millipore water and 10 ml of 1M-NaOH were added to 30 g of this mixture. Then the total amount was treated hydrothermally for 8.5 hours at 190° C. in a steel-cased autoclave made of Teflon.

The powder diffractogram showed that beside the main phases C—S—H(I) and quartz the hydrothermally synthesized mixture contained smaller amounts of 11 Å-tobermorite, $\alpha$-$C_2SH$, portlandite and $CaCO_3$.

C—S—H(I) had no basal reflection and thus was less crystalline (i.e. more disordered) than the C—S—H phase used in Example 1. The reflection at 0.305 nm had the highest intensity, additionally a reflection occurred at 0.28 nm having 40 to 50% of the intensity of the reflection of 0.305 nm. In the infrared spectrum C—S—H(I) was characterized by an intensive and broad band at 972 $cm^{-1}$, which corresponds to the (Si—O) stretching vibration. The Si-O stretching vibration of the quartz, which was also contained in the mixture, was at 1078 $cm^{-1}$.

Subsequently, 2.2 g of this mixture were ground in a disk vibration mill for 180 seconds and thus transferred into an inventive mixture containing the inventive hydraulic binder.

After the grinding the main band of the C—S—H is broadened without any visible change of frequency. A further broad main band of Si—O stretching vibrations has a maximum at 1102 cm$^{-1}$. This shows the depolymerization of the quartz as a result of the grinding. In the range of the OH stretching vibration additional bands caused by silanol groups occur after the grinding.

This finding was confirmed by $^{29}$Si NMR spectroscopy, the measurements after the grinding process resulting in an average silicate polymerization degree of $Q^{1.8}$ with a very broad distribution of the signal in the range of $Q^0$ (chemical shift up to −70 ppm) to $Q^2$ (chemical shift up to −90 ppm).

In the X-ray powder diffractogram the C—S—H reflections were only weakly recognizable after the grinding. Similar to Example 1 there was a slight shift of the reflection at 0.305 nm and 0.28 nm to 0.302 nm and 0.284 nm, respectively. The intensities of the reflections equalize themselves. Secondary phases like portlandite, calcite and α-C$_2$SH are completely destroyed during grinding. In total, the small angle scattering clearly decreased after the grinding: the sample was homogenized.

Subsequently, the inventive mixture containing the inventive hydraulic binder was mixed with water. The binder was hydrated by adding water (mass ratio of water:binder=1.0). In the first few seconds after the proportioning of (mixing) water the release of heat of wetting was observed. After a period of very little net heat release (so-called dormatory period) the actual hydration process started already after a few minutes up to some hours. At a ratio of water to binder of 0.3 and by adding three parts of sand to one part of binder a compressive strength of 20 N/mm$^2$ was exceeded after 28 days.

The amount of C—S—H strongly increased in the X-ray powder diffractogram. Apart from reflections at 0.305 nm and 0.28 nm (C—S—H(I)) a broad reflection was present between 1.9 nm and 1.2 which is typical of the hydration product C—S—H phase having a molar ratio of Ca:Si of less than 1.

EXAMPLE 3

Ca(OH)$_2$ and aerosil were used as starting materials. First, 17.7 g of Ca(OH)$_2$ and 14,3 g of aerosil were intensely mixed in a wobble mixer by means of zirconium oxide balls and compacted (volume reduction). The specific BET surface of the mixture was 87 m$^2$/g. Next, 4 g of this mixture were each ground differently and reacted to the inventive binder. This took place in a disk vibration mill in tungsten carbide grinding vessels for 60 seconds (specific surface after the grinding 17.5 m$^2$/g) and 180 seconds (4,2 m$^2$/g), respectively, and in a ball mill in zirconium dioxide grinding vessels for 60 min. (5.8 m$^2$/g) and 180 min. (3.0 m$^2$/g), respectively.

The formation of the inventive binder was tracked in the IR spectrometer. The initial frequency of the $v_2$ O—Si—O of 471 cm$^{-1}$ in aerosil changed to 478 cm$^{-1}$ with the line broadening simultaneously. This is proven by an internal deformation of the Si tetrahedra which results from changed surroundings of the Si tetrahedra, i.e. a lowered connectedness. The band at 388 cm$^{-1}$, which corresponds to the librational vibrations of the OH groups in portlandite, disappeared through the grinding. At the same time the OH vibration of the portlandite at 3660 cm$^{-1}$ lost some intensity and finally also disappeared. This finding proves that there was a destruction of the portlandite.

Moreover, the newly formed binder became visible by a new broad and very intensive band at 1000 cm$^{-1}$. The main infrared bands at 1105 cm$^{-1}$ and 1205 cm$^{-1}$, respectively, which are known as (Si—O) stretching vibrations of aerosil, were recognizable only as a shoulder which proves the depolymerization of the aerosil and the generation of a new phase having (Ca—O—Si) bonds as a consequence of the grinding. In the range of the OH stretching vibration additional bands caused by silanol groups appear after the grinding.

The hydration of all four batches, which proceeded within a time of 30 hours, was followed by means of a thermal flow calorimeter. An increasing grinding period accelerated the hydration reaction. At a ratio of water to binder of 0.3 and by adding three parts of sand to one part of binder, a compressive strength of 20 N/mm$^2$ was exceeded after 28 days.

EXAMPLE 4

A hydrothermally synthesized mixture of C—S—H(I), α-C$_2$SH, 10 Å-tobermorite and quartz was used as starting materials for grinding.

For the synthesis of the hydrothermally synthesized mixture Ca(OH)$_2$ and quartz, a solution of 1M of NaOH and H$_2$O were hydrothermally treated in a steel autoclave for 4 hours at 160° C.

A quantitative X-ray analysis showed that the hydrothermally synthesized mixture consisted of 37% by weight of amorphous C—S—H phase, 50% by weight of α-C$_2$SH, 12% by weight of quartz as well as a smaller amount of 10 Å-tobermorite, portlandite and CaCO$_3$. In the IR spectrum the amorphous C—S—H phase is characterized by an intensive and broad band at 945 cm$^{-1}$, which corresponds to the (Si-O) stretching vibration. The Si-O stretching vibration of α-C$_2$SH is at 985 cm$^{-1}$. A further band at 754 cm$^{-1}$ is also typical of α-C$_2$SH and corresponds to the Si—O(H) stretching vibrations.

52 g of this mixture were mixed with 52 g of sand and subsequently ground in a disk vibration mill for 720 seconds and thus transformed into the inventive mixture containing the hydraulic binder. The X-ray diffractogram shows that no crystalline components except for quartz are present. A quantitative phase analysis using the Rietveld method and an internal standard shows that the binder consists of 55% by weight of amorphous phase and 45% by weight of quartz.

After the grinding the main band of the C—S—H is considerably broadened. While the band of the Si-O stretching vibrations of α-C$_2$SH remains clearly visible, the band at 754 cm$^{-1}$ (Si—O(H) stretching vibrations, α-C$_2$SH) is no longer present. All bands of the α-C$_2$SH, to which H-atoms contribute, are either no longer there or considerably weakened. What is new is an absorption between 3200 cm$^{-1}$ and 3750 cm$^{-1}$ which corresponds to newly occurring bands caused by silanol groups. The strongest bands of quartz (1078 cm$^{-1}$ and 1177 cm$^{-1}$) shifted to 1095 cm$^{-1}$ and 1165 cm$^{-1}$, respectively, which proves a partial depolymerization.

The binder was hydrated by adding water (mass ratio of water:binder=1.0). In the first few seconds after the proportioning of (mixing) water the release of heat of wetting was observed. After a period of very low net heat release (so-called dormatory period) the actual hydration process started already after a few minutes until up to some hours, the maximum of the heat release being reached after 5 to 10 hours. At a ratio of water to binder of 0.3 and by adding three parts of sand to one part of binder, a compressive strength of 20 N/mm$^2$ was exceeded after 28 days.

The new formation of C—S—H phase having a molar ratio of Ca:Si of about 1.0 was detected by X-ray diffraction.

We claim:

1. A monophase hydraulic binder containing silicon, calcium, oxygen and hydrogen atoms in an arrangement comprising silicate building units having an average connectedness of higher than $Q^{1.5}$ and silanol groups, with none or a part of the calcium atoms being substituted for by a metal atom $M[6]^{x+}$ sixfold or higher coordinated with oxygen and/or none or a part of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.2 to 2.0 and the binder containing 3.5% to 20% by weight of $H_2O$.

2. The monophase hydraulic binder of claim 1, said molar ratio of $$[CaO+(x/2)\cdot(M[6]^{x+}O_{x/2})]:[SiO_2+M[4]^{y+}O_{y/2}]$$

having a value of 0.3 to below 1.0.

3. The monophase hydraulic binder of claim 1, with a part of the calcium atoms being substituted for by Na, K, Li, Mg, Sr, Ba, Mn, Fe[+II] or Al[+III] atoms.

4. The monophase hydraulic binder of claim 1, with a part of the silicon atoms being substituted for by Al, Ge, B, P, Fe, Be or Ti atoms.

5. The monophase hydraulic binder of claim 1 which reacts to hydrates after adding water, wherein more than 50% by weight of the hydrates are calcium silicate hydrates having a molar ratio of $$[CaO+(x/2)\cdot(M[6]^{x+}O_{x/2})]:[SiO_2+M[4]^{y+}O_{y/2}]$$

of smaller than 1.5.

6. A mixture containing a monophase hydraulic binder of claim 1.

7. The mixture of claim 6, containing at least 10% by weight of the monophase hydraulic binder.

8. A method for manufacturing a monophase hydraulic binder of any claim 1 by
reaction grinding a first starting material containing calcium, silicon, oxygen and hydrogen atoms present in the form of structural water, crystal water or hydroxide groups as well as silicate building units having a connectedness of $Q^0$ to $Q^2$, with a second starting material in the form of a solid silicate raw material having a connectedness of the silicate building units of $Q^3$ to $Q^4$, and,
as long as the water content is above 20% by weight, drying the monophase hydraulic binder to an $H_2O$ content of 3.5% by weight to 20% by weight.

9. The method for manufacturing a monophase hydraulic binder claim 1 by
reaction grinding a material, which forms a first starting material during reaction grinding containing calcium, silicon, oxygen and hydrogen atoms present in the form of structural water, crystal water or hydroxide groups, as well as silicate building units having a connectedness of $Q^0$ to $Q^2$, with a second starting material in the form of a solid silicate raw material having a connectedness of the silicate building units of $Q^3$ to $Q^4$, and,
as long as the water content is above 20% by weight, drying the monophase hydraulic binder to an $H_2O$ water content of 3.5% by weight to 20% by weight.

10. The method for manufacturing a mixture according to claim 6 by
reaction grinding raw materials containing a first starting material of claim 8 or a material which according to claim 9 forms the first starting material during reaction grinding, and containing a second starting material of claim 8 or 9 and further materials, and,
as long as the $H_2O$ content of the monophase hydraulic binder is above 20% by weight, drying the mixture until the monophase hydraulic binder contained therein has an $H_2O$ content of 3.5% by weight to 20% by weight.

11. The method of claim 8, wherein quartz or quartz sand are used as the second starting material.

12. The method of claim 8, wherein the first and the second raw materials are present together in one material.

13. The method of claim 10, wherein cement stone that is no longer used as building material or mortars which may contain aggregates or sand, are directly ground.

14. A building material, manufactured by setting the monophase hydraulic binder according to claim 1 or according to the mixture of claim 6 with water and subsequent hardening.

15. The building material of claim 14, containing alkali-sensitive additives.

* * * * *